(12) United States Patent
Miki

(10) Patent No.: US 8,382,564 B2
(45) Date of Patent: Feb. 26, 2013

(54) DAMPER WITH FINS

(75) Inventor: Jeffrey Sadao Miki, Ann Arbor, MI (US)

(73) Assignee: Toyota Motor Engineering & Manufacturing Norht America, Inc., Erlanger, KY (US)

( * ) Notice: Subject to any disclaimer, the term of this patent is extended or adjusted under 35 U.S.C. 154(b) by 988 days.

(21) Appl. No.: 12/276,352

(22) Filed: Nov. 23, 2008

(65) Prior Publication Data

US 2010/0130115 A1    May 27, 2010

(51) Int. Cl.
*B60H 1/34* (2006.01)
*B60H 1/00* (2006.01)

(52) U.S. Cl. ......................................... 454/155; 165/41
(58) Field of Classification Search .................. 454/155; 165/41
See application file for complete search history.

(56) References Cited

U.S. PATENT DOCUMENTS

| | | | |
|---|---|---|---|
| 5,305,823 A * | 4/1994 | Elliot | ............................. 165/41 |
| 5,674,124 A | 10/1997 | Davis | |
| 6,059,652 A | 5/2000 | Terry et al. | |
| 6,244,952 B1 | 6/2001 | Arold et al. | |
| 7,029,390 B2 * | 4/2006 | Karadia | ......................... 454/155 |

* cited by examiner

*Primary Examiner* — Steven B McAllister
*Assistant Examiner* — Helena Kosanovic
(74) *Attorney, Agent, or Firm* — Gifford, Krass, Sprinkle, Anderson & Citkowski, P.C.

(57) ABSTRACT

An air vent with a damper for redirecting air flow within the air vent is provided. The air vent can include a housing that has an air inlet end and an air outlet end. In addition, the air vent has the damper within the housing, the damper having a generally flat surface and being movable between a closed position and an open position. At least one fin can be rigidly attached to and extend from the damper, for the purpose of redirecting air flow through the housing when the damper is in the open position. In some instances, a plurality of fins can extend from the damper, with at least one fin extending from an air inlet side of the damper and at least one fin extending from an air outlet side of the damper. The fins can extend from the generally flat surface of the damper at an angle between 15 and 165 degrees and in some instances extend in a generally normal direction from the damper flat surface. The orientation of the at least one fin relative to the housing affords for redirection of air flow coming through the air inlet end such that it is in alignment with the air outlet end.

10 Claims, 2 Drawing Sheets

US 8,382,564 B2

DAMPER WITH FINS

FIELD OF THE INVENTION

The present invention relates to a damper in an air vent of a motor vehicle. In particular, the invention relates to a damper having fins in an air vent of a motor vehicle.

BACKGROUND OF THE INVENTION

Air vents are typically provided in the dashboards and/or other areas within the interior of motor vehicles in order to control the supply of air from the vehicle air ventilation, heating and/or air conditioning system into the passenger compartment. Looking at FIGS. 1 and 2, a typical air vent can include a housing 10 with an air inlet 12 and an air outlet 14. The air inlet 12 can be attached to an air duct coming from the air ventilation, heating and/or air conditioning system of the motor vehicle. The air outlet 14 provides for air to enter into the passenger compartment. In some instances, the air vent will include a damper 20 which can be moved between an open position and a closed position such that air coming from the air ventilation, heating and/or air conditioning system of the motor vehicle can be prevented or allowed to exit housing 10 via the air outlet 14. It is not uncommon for the air vent to include at least one set of exit vanes, and in some instances include both horizontal exit direction vanes 30 and vertical exit direction vanes 40. The exit vanes 30 and 40 afford for an individual to direct air exiting the air outlet 14 to a number of different positions within the passenger compartment.

Looking specifically at FIG. 2, the housing 10 has a jog 50 such that the air inlet 12 is not collinear with the air outlet 14. In such cases, the flow of air as shown by the arrows can arrive at the air outlet 14 in an offset or biased manner, not be aligned with the exit vanes and result in an inefficient and/or undesirable delivery of air into the passenger compartment. Therefore, an improved air vent that would redirect air flow within such an air vent would be desirable.

SUMMARY OF THE INVENTION

An air vent with a damper for redirecting air flow within the air vent is provided. The air vent can include a housing that has an air inlet end and an air outlet end. In addition, the air vent has the damper within the housing, the damper having a generally flat surface and being movable between a closed position and an open position. At least one fin can be rigidly attached to and extend from the damper, for the purpose of redirecting air flow through the housing when the damper is in the open position. In some instances, a plurality of fins can extend from the damper, with at least one fin extending from an air inlet side of the damper and at least one fin extending from an air outlet side of the damper. The fins can extend from the generally flat surface of the damper at an angle between 15 and 165 degrees and in some instances extend in a generally normal direction from the damper flat surface. The orientation of the at least one fin relative to the housing affords for redirection of air flow coming through the air inlet end such that it is in alignment with the air outlet end.

DETAILED DESCRIPTION OF THE INVENTION

The present invention discloses an air vent with a damper for redirecting air flow within the air vent. As such, the air vent disclosed herein has utility as a component for an air delivery system.

The air vent includes a housing with an air inlet end and an air outlet end. In addition, the air vent can include a damper within the housing, the damper having a generally flat surface and being movable between a closed position and an open position. It is appreciated that when the damper is in the closed position, air flowing from an air ventilation, heating and/or air conditioning system of the motor vehicle is not allowed to exit the air vent through the air outlet end. It is further appreciated that when the damper is in the open position that air is allowed to exit the air outlet end. The air vent can also include at least one fin that is rigidly attached to and extends from the damper. The fin or fins extend from the damper and are oriented relative to the housing such that air flowing through the housing and entering through the air inlet is redirected to be generally in alignment with the air outlet end upon reaching this location.

In some instances, the fin or fins is collinear with the air outlet end of the housing. In addition, the fin or fins can extend from the generally flat surface of the damper at an angle between 15 and 165 degrees. In other instances, the fin or fins can extend from the generally flat surface of the damper at an angle between 60 and 120 degrees, and in yet other instances the fin or fins can extend from the damper in a generally normal direction.

The damper has an air inlet side surface that faces the air inlet end of the housing and an air outlet side surface that faces the air outlet end of the housing when the damper is in the closed position. The damper can have at least two fins extending therefrom, with at least one fin extending from the air inlet side surface and at least one fin extending from the air outlet side surface. The housing can include a jog, the jog resulting in the air inlet end being nonlinear with the air outlet end. In this case, the fin or fins redirect air flow coming from the air inlet end into linear alignment with the air outlet end.

Figure 1:
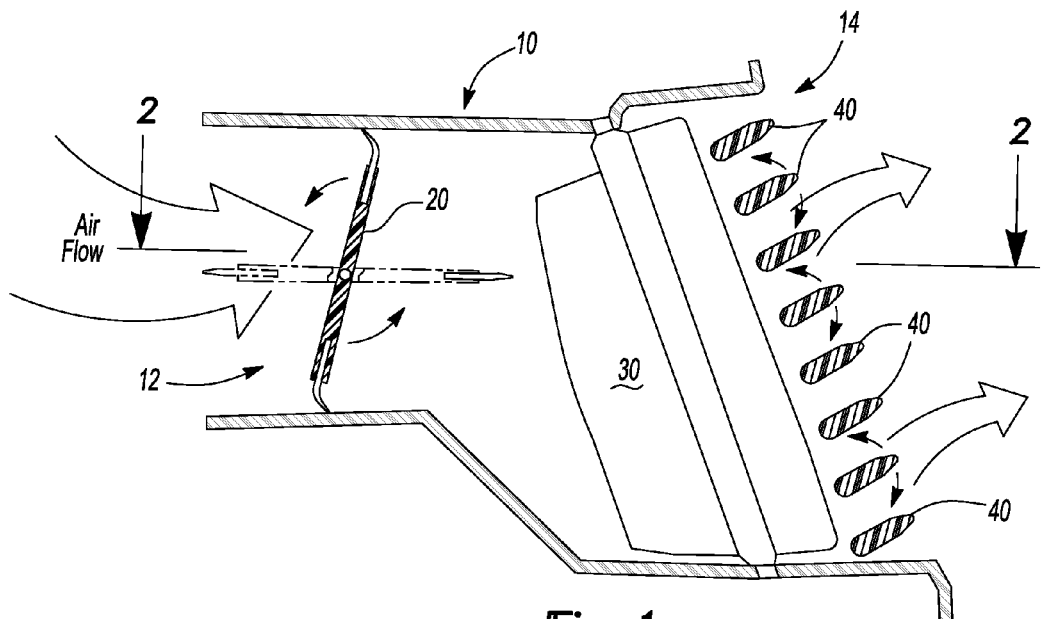
FIG. 1 is a side cross-sectional view of a prior art air vent.
Figure 2:
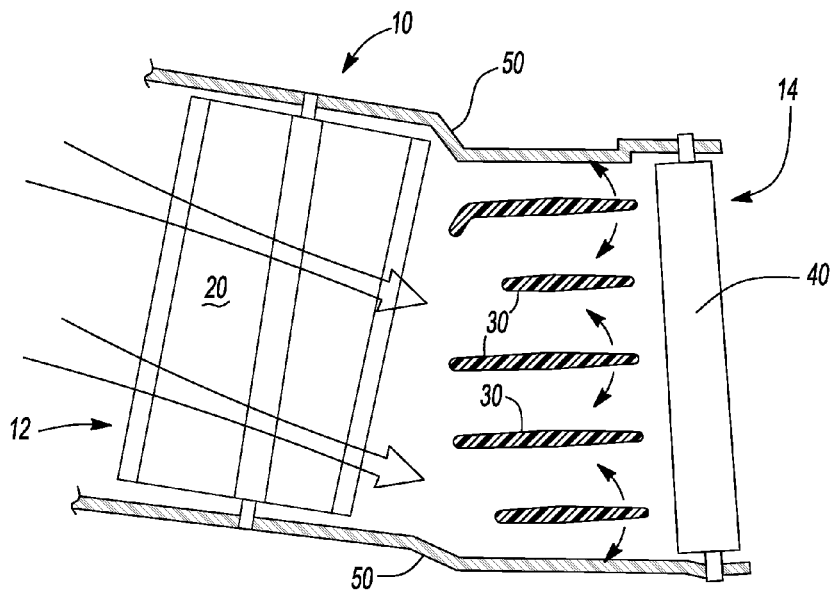
FIG. 2 is a top cross-sectional view of a prior art air vent.
Figure 3:
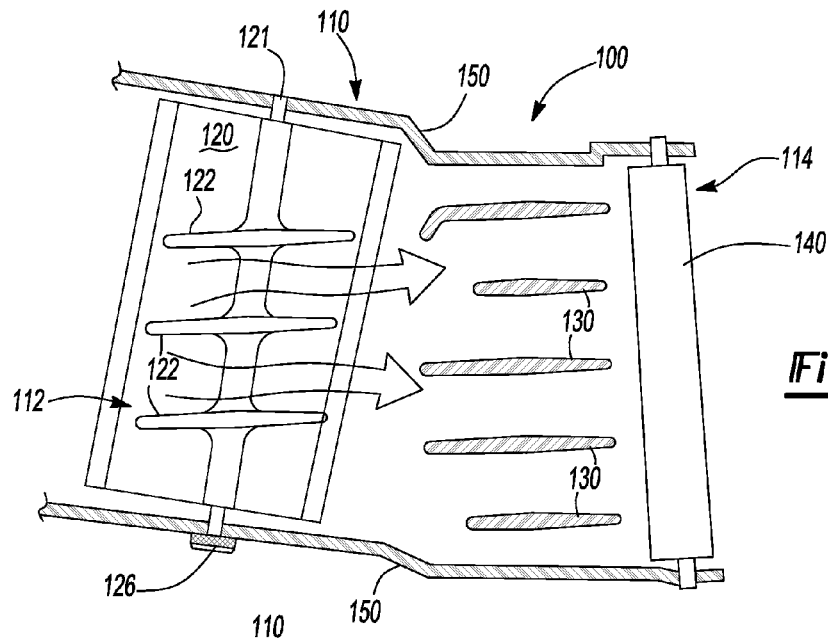
FIG. 3 is a top cross-sectional view of an embodiment of an air vent of the present invention.
Figure 4:
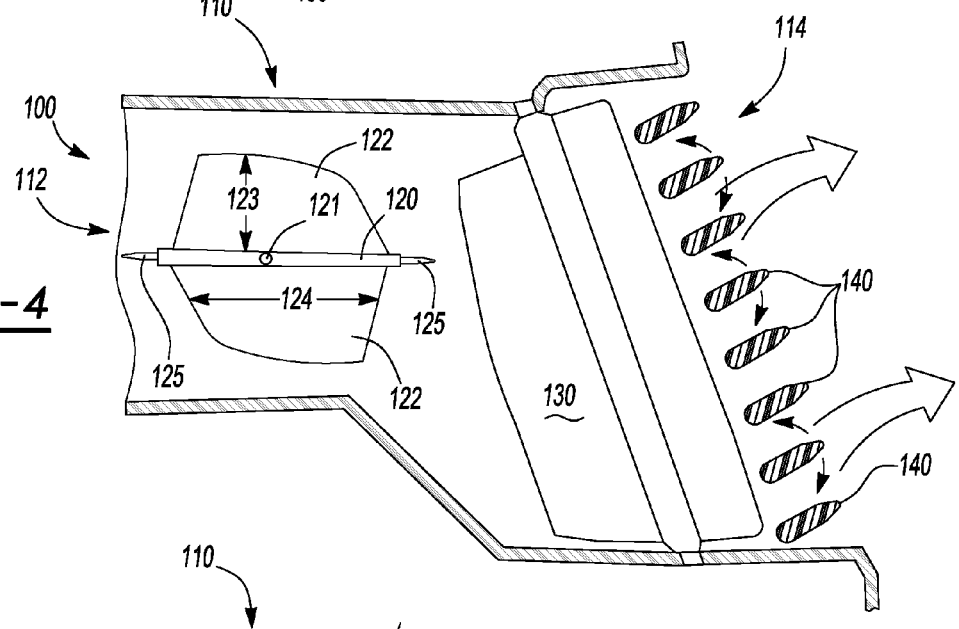
FIG. 4 is a side cross-sectional view of the embodiment shown in FIG. 3.
Figure 5:
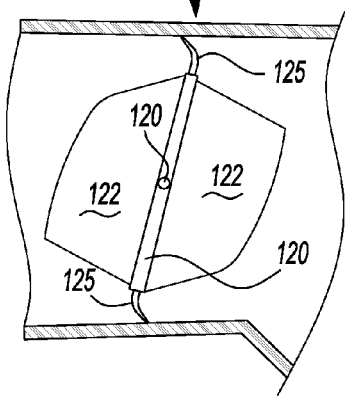
FIG. 5 is a side cross-sectional view of the embodiment shown in FIG. 4 with the damper in the closed position.

Turning now to FIGS. 3-5, an embodiment of an air vent with a damper for redirecting air flow is shown. The air vent is shown generally at reference numeral 100, the air vent 100 having a housing 110 with an air inlet end 112 and an air outlet end 114. It is appreciated that the housing 110 has a wall that defines an interior volume within the housing 110. Also included within the housing 110 can be a damper 120, the damper 120 having at least one fin 122 extending therefrom. In some instances, the damper 120 has a generally flat surface from which the fin 122 extends from. The fin 122 can have a height direction 123 and a length direction 124. It is appreciated that the length direction 124 extends along a surface of the damper 120 while the height direction 123 extends outwardly from the surface of the damper 120. It is also appreciated that the at least one fin 122 can be generally planar and has one end attached to the damper 120 and another end that is unattached or freestanding. The damper 120 can include a control knob 126 which affords for the movement of the damper between a closed position and an open position, although other control mechanisms for moving the damper 120 can be used and still be within the scope of the present invention.

Optionally included within the air vent 100 can be a first set of exit vanes 130 and/or a second set of exit vanes 140. In some instances, the first set of exit vanes 130 afford for an individual to control the horizontal direction of air flow exiting the vent 100 through the air outlet end 114. In addition, the second set of exit vanes 140 can afford for an individual to control the vertical air flow of air exiting the air outlet end 114.

As shown particularly in FIG. 3, the housing 110 has a jog 150 that results in a nonlinear orientation of the air inlet end 112 relative to the air outlet end 114. It is appreciated that this nonlinear orientation can result in air flow through the air inlet end 112 not being in proper alignment with the first set of exit vanes 130 and/or the second set of exit vanes 140. As such, the fins 122 redirect the air flow through the housing 110 such that it more directly impacts and/or flows past the two sets of exit vanes and thereby provides a more efficient delivery of air to the passenger compartment. In some instances, the one or more fins 122 can be collinear with the air outlet end 114, however this is not required. As such, it is appreciated that a fin 122 extending from an air inlet side surface of the damper 120 and a fin 122 extending from an air outlet side surface of the damper 120, both being collinear with the air outlet end 114, can be aligned generally parallel to each other. The jog 150 is shown for illustrative purposes only and the housing 110 can have other shapes with bends, curves and the like which result in a misalignment of air flowing through the air outlet end 114.

The damper 120 can optionally include a flexible tab 125 extending therefrom, the tab 125 ensuring for a relatively airtight seal between the damper 120 and the housing 110 when the damper 120 is in the closed position. The air vent 100, housing 110, damper 120, fins 122, etc. can be made from any material known to those skilled in the art, illustratively including plastics, metals, ceramics, wood and combinations thereof. It is appreciated that the damper 120 and the exit vanes can be controlled using control knobs, control levers, etc. and/or can be controlled using powered manipulation afforded by electric and/or pneumatic motors.

The invention is not restricted to the illustrative examples described above. The examples are not intended as limitations on the scope of the invention. Methods, apparatus, and the like described herein are exemplary and not intended as limitations on the scope of the invention. Changes therein and other uses will occur to those skilled in the art. The scope of the invention is defined by the scope of the claims.

I claim:

1. An air vent with a damper for redirecting air flow within the air vent, said air vent comprising:
    a housing having an air inlet end and an air outlet end, said housing also having a jog with said jog resulting in said air inlet being nonlinear with said air outlet;
    a damper within said housing, said damper having a body having a pair of oppositely disposed ends, a generally flat air inlet side surface and a generally flat air outlet side surface extending between said pair of oppositely disposed ends, said damper movable between a closed position and an open position;
    a flexible tab extending from each of said pair of oppositely disposed ends of said damper; and
    a first fin rigidly attached to and extending from said air inlet side surface and a second fin rigidly attached to and extending from said air outlet side surface of said damper, said first fin and said second fin each having a freestanding end wherein each of said first and second fin is disposed at an acute angle to the pivotal axis of said damper and a perpendicular angle with the respect the body of the damper and being generally aligned parallel with each other, said first fin and said second fin also being generally collinear with said air outlet and not collinear with said air inlet, for the purpose of redirecting air flow through said housing from said air inlet to said air outlet when said damper is in the open position.

2. The air vent of claim 1, wherein said first fin and said second fin are generally planar fins that extend from said damper at an angle between 15 and 165 degrees.

3. The air vent of claim 2, wherein said first fin and said second fin extend from said damper at an angle between 60 and 120 degrees.

4. The air vent of claim 3, wherein said first fin and said second fin extend in a generally normal direction from said damper.

5. An air vent with a damper for redirecting air flow within the air vent, said air vent comprising:
    a housing having a wall defining an interior volume, said housing also having an air inlet end and an air outlet end, said housing also having a jog with said jog resulting in said air inlet being nonlinear with said air outlet;
    a damper within said interior volume of said housing between said air inlet end and said air outlet end, said damper having a body having a pair of oppositely disposed ends, a generally flat air inlet side and a generally flat air outlet side extending between said pair of oppositely disposed ends, said damper movable between a closed position and an open position;
    a flexible tab extending from each of said pair of oppositely disposed ends of said damper; and
    a plurality of generally planar fins each having a freestanding end, wherein each of said first and second fin is disposed at an acute angle to the pivotal axis of said damper and a perpendicular angle with the respect the body of the damper extending from said damper and with at least one fin extending from said air inlet side of said damper and at least one fin extending from said air outlet side, said plurality of generally planar fins being generally collinear with said air outlet and not collinear with said air inlet, and said at least one fin extending from said air inlet side of said damper and said at least one fin extending from said air outlet side of said damper being parallel with each other, for the purpose of directing air flow through said housing from said air inlet to said air outlet when said damper is in said open position.

6. The air vent of claim 5, further comprising a damper control valve coupled to said damper and operable to move said damper between said open position and said closed position.

7. The air vent of claim 5, wherein said plurality of generally planar fins extend from said damper at an angle between 60 and 120 degrees.

8. An air vent with a damper having fins for redirecting air flow within the air vent, said air vent comprising:
    a housing having a wall defining an interior volume, said housing also having a jog resulting in a nonlinear length between an air inlet end and an air outlet end;
    a damper within said interior volume of said housing between said air inlet end and said air outlet end, said damper having a body having a pair of oppositely disposed ends, a generally flat air inlet side and a generally flat air outlet side extending between said pair of oppositely disposed ends, said damper movable between a closed position and an open position;
    a flexible tab extending from each of said pair of oppositely disposed ends of said damper; and a plurality of generally planar fins rigidly attached to and extending from said damper and with at least one fin having a freestanding end wherein each of said first and second fin is disposed at an acute angle to the pivotal axis of said damper and a perpendicular angle with the respect the body of the damper and extending from said generally flat air inlet side of said damper and at least one fin having a freestanding end and extending from said generally flat air outlet side, said plurality of generally planar fins being generally collinear with said air outlet and not collinear with said air inlet, and said at least one fin extending from said air inlet side of said damper and said at least one fin extending from said air outlet side of said damper being generally parallel with each other, for the purpose of redirecting air flow through said housing from said air inlet to said air outlet when said damper is in said open position.

9. The air vent of claim 8, wherein said plurality of generally planar fins extend from said damper at an angle between 60 and 120 degrees.

10. The air vent of claim 8, further comprising a damper control valve coupled to said damper and operable to move said damper between said open position and said closed position.

* * * * *

UNITED STATES PATENT AND TRADEMARK OFFICE
CERTIFICATE OF CORRECTION

PATENT NO. : 8,382,564 B2  
APPLICATION NO. : 12/276352  
DATED : February 26, 2013  
INVENTOR(S) : Jeffrey Sadao Miki It is certified that error appears in the above-identified patent and that said Letters Patent is hereby corrected as shown below:

Title Page:

Item (73) Assignee, delete "Norht", insert --North--

Signed and Sealed this
Fourteenth Day of October, 2014

Michelle K. Lee
*Deputy Director of the United States Patent and Trademark Office*